T. Deschamps.
Glove Fastener.
N°. 90,348. Patented May 25, 1869.
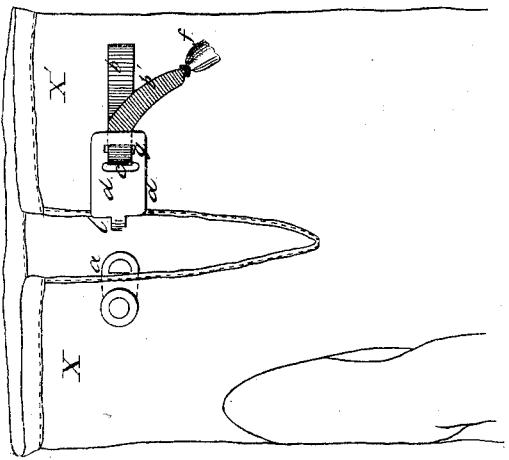
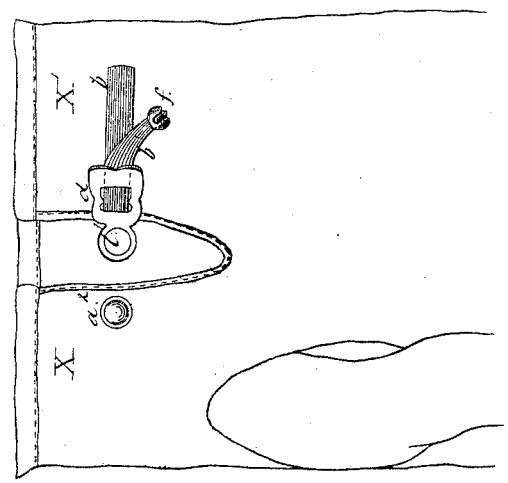
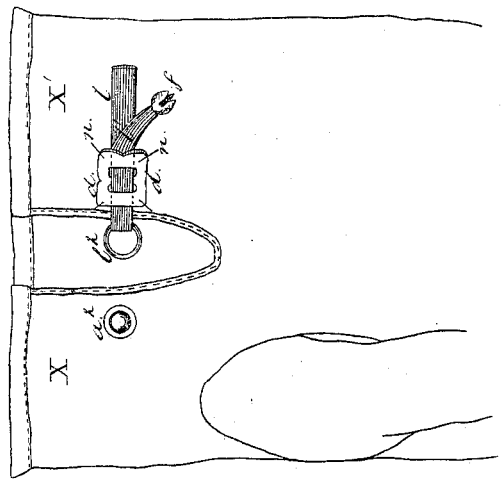
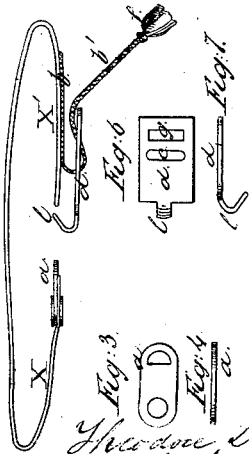
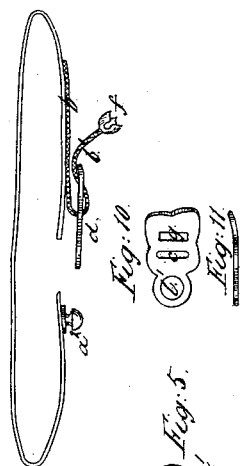
Witnesses.
P. W. Weston
L. A. Roberts
Inventor
Theodore Deschamps
By H. James Weston
Atty.

United States Patent Office.

THÉODORE DESCHAMPS, OF PARIS, FRANCE.

Letters Patent No. 90,348, dated May 25, 1869.

---

IMPROVED FASTENING FOR GLOVES.

---

The Schedule referred to in these Letters Patent and making part of the same.

---

Specification of an Improved Fastening for Gloves, by THÉODORE DESCHAMPS, merchant, at Paris, France.

My improved fastening provides an easy and gradual means of closing gloves, and consists in a certain combination of a hook, clasp, and lace.

This mode of fastening gloves will be understood by reference to the hereunto-annexed drawing and the following description.

I proceed to describe it as applied to an ordinary glove.

Figure 1 represents, on a large scale, a fragment of a glove with the application of my improved fastening.

Figure 2 is a plan of the same.

Upon the thumb-side X of the glove, at the place where the button or button-hole is usually formed, I attach, by sewing, or riveting, or otherwise, a hook, $a$.

This hook, separately represented in Figures 3 and 4, has two apertures, one of which is used for securing it to the glove; the other forms an eye or loop to serve instead of a button-hole.

This hook may be of the form of a grooved plate, represented at $a^1$, Figure 5, with pins to be riveted on the glove.

On the side $X^1$ of the glove opposite to the thumb, I attach, by sewing or otherwise, one end, $b$, of a lace or tape, the other end, $b^1$, of which is carried under the rear end of a hooked plate, $d$, which serves to press, and forms a clasp, then up through a slit, $c$, on this plate, $d$, and down through another slit, $g$, coming out again at the rear end of the plate or clasp $d$, and terminates by a knot or tassel, $f$.

The knot or tassel $f$, coming out thus underneath the edge of the edge or plate $d$, holds both in place.

The other end of this clasp or plate, $d$, terminates, as seen in Figures 6 and 7, in a hook or crotchet, $l$, which takes into the eye $a$ or $a^1$ of the hook which serves as a button-hole, as seen in figs. 1 and 2.

Gloves furnished with this arrangement can be unfastened in two manners, either by raising the pressure-plate on clasp $d$ and drawing the lace $b^1$, or by simply releasing the hook $l$ from the eye $a$ or $a^1$.

Figures 8 and 9 represent a variation in the arrangement of fastening.

I substitute, to the eye $a$ or $a^1$ of the figs. 1 and 2, a button, $a^2$; and instead of the crotchet $l$, the clasp $d$ has an aperture, $l^1$, as seen in Figures 10 and 11.

The pressure-clasp $d$, in the arrangement of figs. 1 and 2, and of figs. 8 and 9, may slide, and is not fixed on the glove.

The arrangement represented at Figure 12 shows the rear edge of the clasp $d$ fixed to the glove by sewing, at $n$ $n$, but in this case the clasp $d$ has no more the crotchet $l$, neither the aperture $l^1$.

I introduce a ring, $l^2$, between the two ends $b$ $b^1$ of the lace.

The ring $l^2$, instead of the aperture $l^1$ of fig. 8, takes on the button $a^2$.

The forms and dimensions of eye $a$, or hook $a^1$, or button $a^2$, and clasp $d$, and crotchet $l$, or aperture $l^1$, or ring $l^2$, may of course be greatly varied, and they can be constructed of a common or precious metal, and in ornamental form.

The tape or lace may be of silk or other inextensible or elastic material.

One or more of these fastenings may be applied to one glove, as in gloves with two or more button-holes and buttons.

Having now described the nature of my said invention, and in what manner the same is to be performed, I declare that I claim as my improvement in fastenings for gloves—

1. The combination of the eye or hook $a$ or $a^1$ of the clasp $d$, with a crotchet, $l$, and of the ends $b$ $b^1$ of the lace, substantially as hereinbefore described, and represented in figs. 1 and 2.

2. The combination of the button $a^2$ of the clasp $d$ with an aperture, $l^1$, and of the two ends $b$ $b^1$ of the lace, substantially as hereinbefore described, and represented in figs. 8 and 9.

3. The combination of the button $a^2$, of the clasp $d$, and of the ring $l^2$ movable between the two ends $b$ $b^1$ of the lace, substantially as hereinbefore described, and represented in fig. 12.

In witness whereof, I, the said THÉODORE DESCHAMPS, have hereunto set my hand, this 18th day of January, in the year 1869.

T. DESCHAMPS.

Witnesses:
C. LAFOND,
F. OLCOTT.